United States Patent [19]

Beauchet

[11] 4,045,100
[45] Aug. 30, 1977

[54] CONCENTRIC ANTIFRICTION BEARING ASSEMBLY

[75] Inventor: Jean Beauchet, Annecy, France

[73] Assignee: Societe Nouvelle de Roulements, Annecy, France

[21] Appl. No.: 636,389

[22] Filed: Dec. 1, 1975

Related U.S. Application Data

[63] Continuation of Ser. No. 440,919, Feb. 8, 1974, abandoned.

[30] Foreign Application Priority Data

Feb. 14, 1973 France .................. 73.05238
May 16, 1973 France .................. 73.17798

[51] Int. Cl.² .............. F16C 19/16; F16C 19/38; F16C 33/34; F16C 33/48
[52] U.S. Cl. .................. 308/183; 308/174; 308/191; 308/202; 308/211; 308/234; 308/235
[58] Field of Search ............ 308/188, 191, 193, 195, 308/196, 197, 199, 200, 201, 206, 207 R, 208, 209, 210, 211, 212, 213, 214, 216, 217, 233, 235, 174, 183, 202, 234

[56] References Cited

U.S. PATENT DOCUMENTS

| 610,970 | 9/1898 | McAlpine | 308/200 X |
|---|---|---|---|
| 731,720 | 6/1903 | Thomas | 308/211 |
| 877,835 | 1/1908 | Daniel | 308/191 X |
| 2,081,566 | 5/1937 | Winkler | 308/191 X |
| 2,617,688 | 11/1952 | Stewart | 308/183 X |
| 3,633,982 | 1/1972 | Germann | 308/191 |
| 3,799,633 | 3/1974 | Pizzotti et al. | 308/183 |
| 3,860,301 | 1/1975 | Zerbola | 308/183 |
| 3,871,724 | 3/1975 | Brandenstein et al. | 308/195 X |

FOREIGN PATENT DOCUMENTS

| 342,163 | 1/1931 | United Kingdom | 308/191 |
|---|---|---|---|
| 1,139,144 | 1/1969 | United Kingdom | 308/191 |

Primary Examiner—Robert J. Spar
Assistant Examiner—Howard Beltran
Attorney, Agent, or Firm—Beveridge, DeGrandi, Kline & Lunsford

[57] ABSTRACT

An antifriction bearing assembly having two rows of bearing elements running in races of different diameters and laying approximately in the same radial plane. The bearing races and mounting rings are made up of an assembly of flange members formed from sheet metal or thin metal plate and including an inner and an outer flange each defining a race for the inner or the outer row of bearing elements and an intermediate flange defining either an inner or an outer race for each of the rows of bearing elements. The bearing is mounted on two relatively rotatable members by directly securing the rotatable members to the bearing's ring structure which is formed as an integral part of the flanges.

16 Claims, 13 Drawing Figures

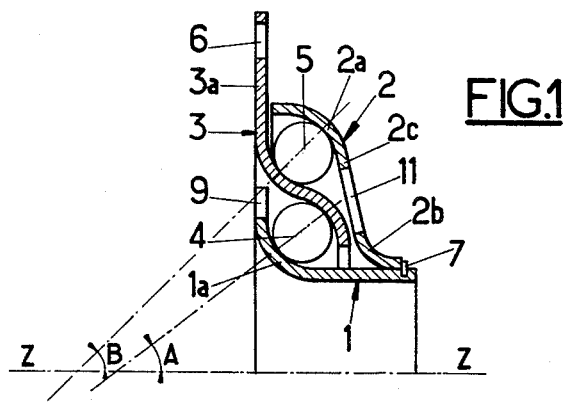
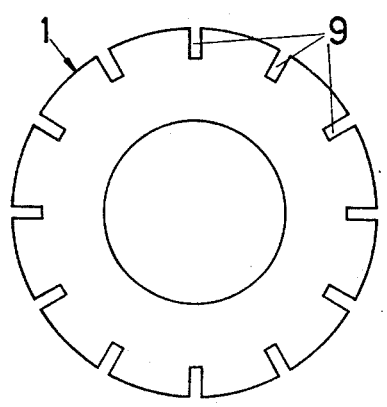
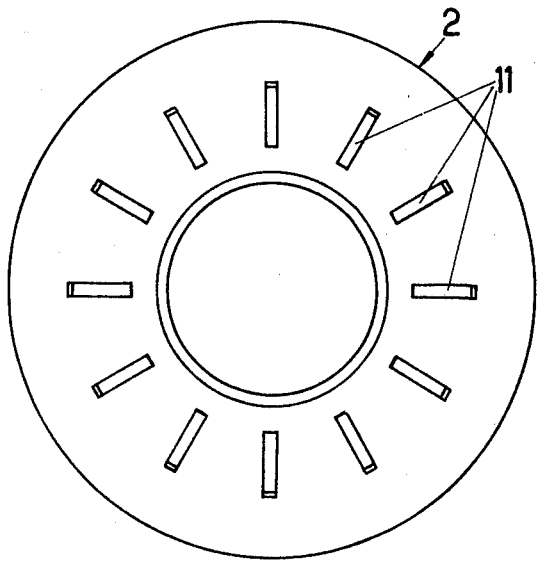
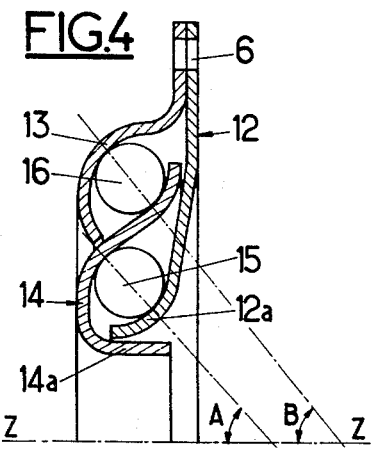
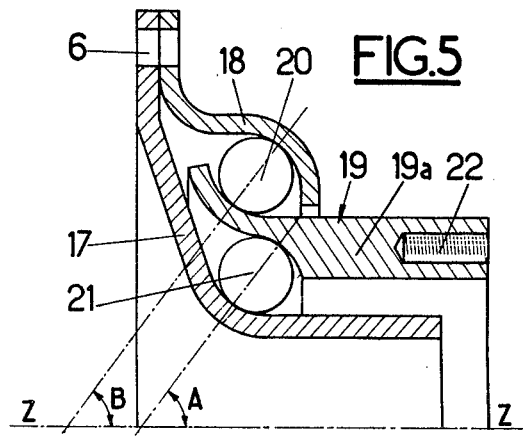

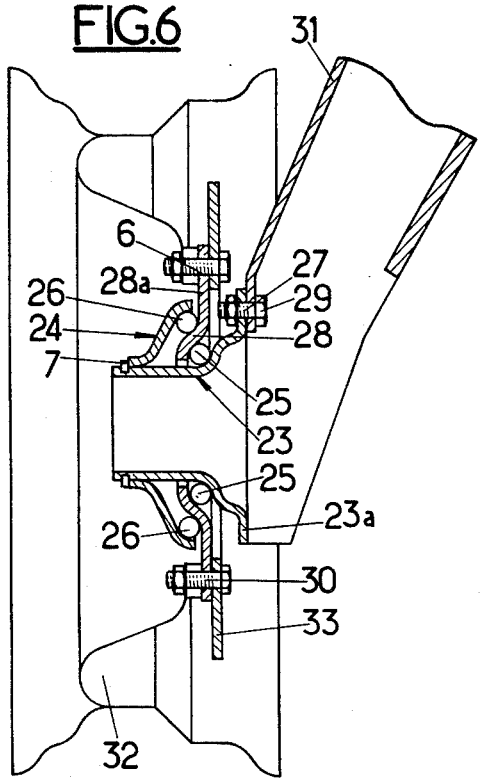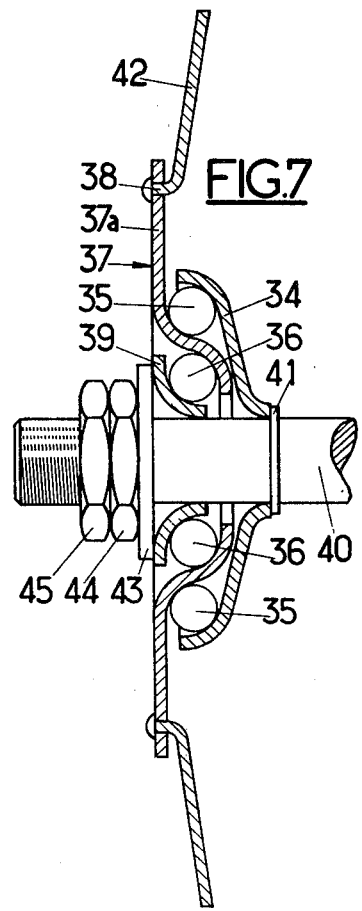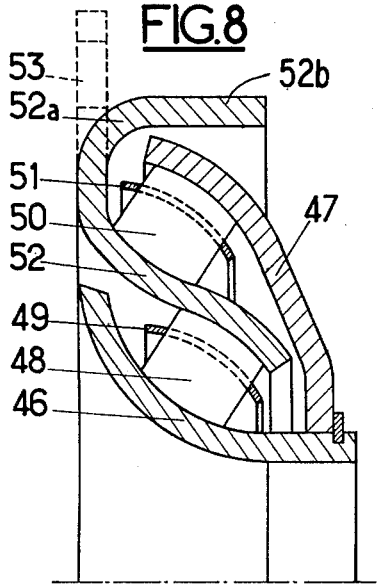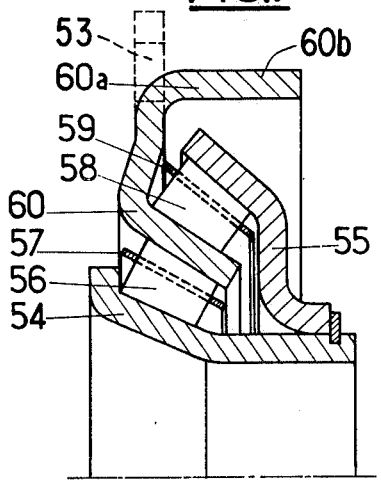

CONCENTRIC ANTIFRICTION BEARING ASSEMBLY

This is a continuation of application Ser. No. 440,919 filed Feb. 8, 1974, now abandoned.

BACKGROUND OF THE INVENTION

1. Field of the Invention

This invention relates to antifriction bearings such as roller bearings or ball bearings, and more particularly to an antifriction bearing having two rows of bearing elements separated from one another by an intermediate element acting as either the inner or outer race for each of the two rows of bearing elements, with the races for the two rows of bearing elements being of different diameters.

2. Description of the Prior Art

Bearings are known with several rows of bearing elements, whose essential characteristics are that the bearing elements travel in distinct rows, the diameter of the races being identical for each of them. Bearings of this general type include rigid bearings with two rows of bearing elements as well as oscillating bearings having two rows of bearing elements.

Ball bearings having plural rows of balls with races of different diameter for each are also known. Bearings of this type are generally made up of three rings and are generally called "redundant bearings". These redundant bearings with their two rows of balls of standard type present a massive structure and are complex and expensive to manufacture because of the various machining operations and techniques required.

SUMMARY OF THE INVENTION

The present invention has for his object to provide a bearing with two rows of bearing elements supported in races of different diameter for each row of bearing elements, and whose fabrication is particularly suited to the making of the inside and outside ring structures from metallic flanges obtained from the forming of heavy sheet metal or light gauge metal plate (hereinafter, sheet metal) by deforming the flat sheet metal blanks, and with the flanges also forming the bearing races.

When balls are used as the bearing elements, the angles of contact of the radially outer balls and the radially inner balls can be identical or different, as desired, the values of these angles being defined as a function of the particular application. The present invention makes it possible to provide bearings particularly suited to support combined axial and radial loads.

The present invention also has for an object to provide a roller bearing presenting the advantage of not necessarily requiring a separate fastening housing, as the bearing can be fastened directly by lateral clamping of the outer or inner ring portion with suitable fastening means such as screws, studs, etc., or by welding.

The invention also has as an object the realization of bearings well suited to support axial loads in two directions or combined axial and radial loads and to assure rigid guiding both in the axial and radial direction.

According to the present invention, the antifriction bearing is intended to be mounted between two relatively rotatable mechanical elements, and is of the type in which two rows of bearing elements are placed in approximately the same radial plane. The bearing includes inner and outer flanges each engaging one of the rows of bearings and an intermediate flange in contact with the two rows of bearing elements, these three flanges of sheet metal being assembled and shaped so as to cooperate to define two sets of bearing races of different diameter, one for each of the two rows of bearing elements. According to one embodiment of the invention, the antifriction bearing is characterized by the fact that the intermediate flange of shaped sheet metal comprises means permitting its attachment on one of the mechanical elements, with the other flanges of shaped sheet metal presenting such a configuration that they can be directly fastened on the other mechanical element.

In one embodiment of a bearing according to the invention, the intermediate flange constitutes the inside race for one of the rows of bearing elements and the outside race for the other row, the other races being made up by the inner and outer flanges. The intermediate flange can then form the inside mounting structure or ring of the bearing, with the two remaining flanges forming the outside ring.

In a variation of this embodiment, the intermediate flange forms the outside ring of the bearing, the inner and outer flanges forming the inside ring. The inner and outer flanges are preferably mechanically linked directly with one another; however, in a variant, these two flanges are not in direct contact and are locked relative to one another in an adjustable manner as a function of the load applied to the bearing.

The intermediate flange can be fastened on one of the mechanical elements by means of a portion of the flange being shaped in the form of a collar permitting lateral clamping. This fastening can also be accomplished by a portion of the flange presenting the shape of a tubular sleeve whose axis is merged with the axis of rotation of the mechanical elements, i.e., with the axis of the bearing. In this embodiment, the structure of the bearing is preferably such that the straight lines joining the points of outside and inside contact of the bearing elements of the two rows of bearing elements cuts the axis of the bearing at acute angles, either equal or different.

In a second embodiment of the bearing according to the invention, the intermediate flange constitutes the inner races of both rows of bearing elements, each outside race being made up of one of the other flanges. The intermediate flange can advantageously form the inside mounting ring of the bearing, with the inner and outer flanges forming the outside ring. For this purpose, the intermediate flange presents a portion in the shape of a tubular sleeve that can be mounted directly on one of the mechanical elements. If desired, one of the other flanges can be shaped to also present a portion in the shape of a tubular sleeve that can be engaged in a bore of the other mechanical element, the inner and outer flanges being in addition mechanically directly joined to one another.

In a further variant, the inner and outer flanges cooperate to define a radial collar directed outward and permitting their fastening on the mechanical element.

In a third embodiment, the intermediate flange constitutes outside races of the two rows of bearing elements, each inside race being made up by one of the other flanges. The intermediate flange then advantageously forms the outside mounting ring of the bearing, the two other flanges forming the inside ring. For this purpose, the flanges can present configurations comparable to those of the second embodiment.

In the second and third embodiments, the structure of the bearing is preferably such that the straight lines joining the outside and inside points of the bearing elements of the two rows of bearing elements, mentioned above, cut the axis of the bearing respectively at an acute and an obtuse angle.

The bearing elements used in the antifriction bearing according to this invention can be of different types such as balls, cylindrical rollers, conical rollers, barrel rollers, etc. The different bearing elements constituting the respective rows can be separated from one another by means of conventional separation cages.

BRIEF DESCRIPTION OF THE DRAWINGS

Other characteristics and advantages of the invention will appear from the following specification, taken in conjunction with the accompanying drawings, in which:

FIG. 1 is a fragmentary sectional view of a ball bearing according to the invention whose intermediate flange constitutes an inside race and an outside race and whose inside ring is made up of an inner and an outer flange mechanically linked together;

FIG. 2 is an end elevation view of the inner flange as seen from the left in FIG. 1;

FIG. 3 is an elevation view of the outer flange as seen from the right in FIG. 1;

FIG. 4 is a fragmentary sectional view of a further embodiment of the invention;

FIG. 5 is a fragmentary sectional view of a variation of the embodiment of the invention shown in FIG. 4;

FIG. 6 is a view in diagrammatic section of a variant applied to a wheel of an automobile;

FIG. 7 is a view in diagrammatic section of a variant applied to the hub of a bicycle wheel;

FIG. 8 is a fragmentary sectional view of a further embodiment of the invention;

FIG. 9 is a view similar to FIG. 8 and showing a variation thereof;

DESCRIPTION OF THE PREFERRED EMBODIMENTS

Figure 10:
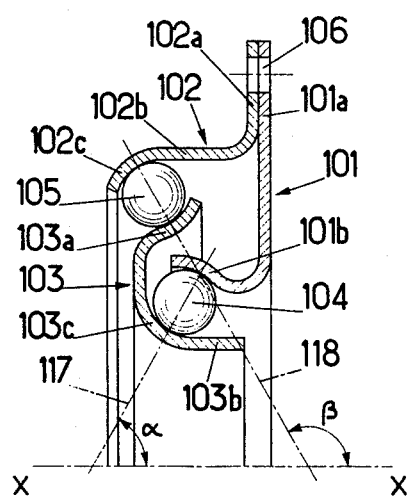
FIG. 10 is a fragmentary sectional view of a further bearing constructed according to the invention.

Referring to the drawings in detail, an antifriction bearing according to the invention is illustrated in FIG. 1 as including inner and outer annular flange members 1 and 2, respectively, and an intermediate annular flange member 3. The respective flanges are formed from blanks of suitable gauge sheet metal or metal plate which are shaped by conventional forming processes into the desired configuration. Flanges 1, 2 and 3 are assembled together to form inner and outer races for an inner row of balls 4 and an outer row of balls 5. A radially extending collar portion 3a of flange 3 defines an outer ring structure suitable for mounting the bearing to one of a pair of relatively rotatable members (not shown) and the radially inner portions of flanges 1 and 2 cooperate to form an inner ring structure suitable for mounting the bearing in the outer of the relatively rotatable members. The inner portion of inner flange 1 is shaped so as to present a tubular mounting ring which gradually blends into a contoured portion 1a whose shape presents a radius in a plane containing the axis of the bearing which is slightly greater than that of the balls 4, thus forming the inner race for the inner row of balls.

Flange 2 is formed so as to present an approximately truncated conical configuration which, at its larger diameter portion 2a defines the outer race for balls 5 and, in its smallest diameter portion 2b, a circular centering which is positioned and secured on the smallest outside diameter portion of inside flange member 1.

Flanges 1 and 2 of the inside ring are thus functionally joined by a snap ring 7 for locking and holding outside flange 2 on inside flange 1. Other holding means such as welding or a system made up of screw fasteners or the like can be used to rigidly join flanges 1 and 2.

The inner row of balls 4 is encased by intermediate flange 3 having an outwardly extending portion 3a forming an outside mounting ring. Flange 3 is made up of a piece of sheet metal formed so as to present the radial collar 3a which can be pierced adjacent its outer periphery with holes 6 which serve for fastening the flange 3 to a mechanical element such, for example, as the wheel 32 of FIG. 6. The suitable shape of this flange 3 forming the outside ring provides on its inner surface the outer race for balls 4 and, on its outer surface the inner race for balls 5, said balls 4 and 5 being located approximately in the same radial plane in relation to the axis of the bearing. As seen from the drawings, the flange members are of substantially uniform thickness throughout. The straight lines joining the points of contact of balls 4 and 5, respectively, cut the axis ZZ of the bearing of FIG. 1 at angles A and B respectively, which angles are different but both acute.

FIG. 2 shows inner flange 1 of the bearing of FIG. 1 which, in its radially outer portion, is preferably formed with notches 9 to give it a greater elasticity and to facilitate the forming process. According to FIG. 3, identical notches 11 can be made in the truncated conical part 2c of outer flange 2 of the bearing of FIG. 1 to give it, also, greater elasticity and to facilitate forming.

FIG. 4 represents a bearing according to the present invention which includes an outside ring portion, properly so-called, made up of portions of the inner and outer flanges 12 and 13, an inside ring portion made up of a portion of the intermediate flange 14, and inner and outer rows of balls 15, 16, respectively. Inner flange 12 of the outside ring consists of an annular piece of sheet metal which is shaped so as to present in the vicinity of its center a hollowed, doubly curved, shaped 12a which has a radius in the plane containing the bearing axis which is slightly greater than that of balls 15 which travel in this part 12a and which constitutes the inner race for these balls. Outer flange 13, which forms a portion of the outside ring, also consists of an annular piece of sheet metal shaped approximately toric in its central part and whose inside profile defines the outer race for ball 16. Intermediate flange 14, which forms the inner ring, consists of a shaped annular piece which, on its outer peripheral portion, encases balls 16 and whose inner part 14a is shaped to define the bore of the inside ring of the bearing. The shape of the flange 14 also defines, on its outer surface and toward the outside periphery, the inner race where balls 16 and, on its inner surface, the outer race for balls 15, the balls 15 and 16 being located approximately in a plane perpendicular to the axis of the bearing.

Inner and outer flanges 12 and 13 of the outside ring can be pierced with holes 6 located on the same diameter to permit an assembly of the flanges together and the fastening of the outside ring to the outer of two relatively rotatable mechanical elements. The assembly of the two flanges 12 and 13 together can be accomplished by bolts, screws, rivets, welding or any other suitable mechanical means.

FIG. 5 represents a variation of the bearing of FIG. 4. According to this variant, the bearing consists of an outer ring made up of inner and outer flanges 17, 18, respectively, an outer and an inner roll of balls 20, 21, respectively, and an intermediate flange 19 separating the two rows of balls 20 and 21 and acting as the inside ring. The two flanges 17 and 18 have holes 6 formed in their outer periphery area to permit assembly of the flanges together and to permit fastening of the unit on the mechanical element to be bearing mounted. To this end, the intermediate flange 19 is formed with an annular collar 19a provided with threaded bores 22 permitting the fastening of intermediate flange 19 forming the inside ring on a connecting member by means of screw fasteners. The straight lines joining the points of contact of balls 15, 16 and 20, 21 respectively, also cut axes 22 of the bearings of FIGS. 4 and 5 at two acute angles A and B in the manner described above.

FIG. 6 presents a variation of the bearing of FIG. 1 as applied to an automobile wheel. The bearing comprises an inside ring made up of inner and outer flanges 23 and 24. Inner flange 23 is formed to include a radial collar 23a pierced with holes 27 at the outer periphery to permit its fastening onto the stub axle 31 with bolts 29. Outer flange 24 is mounted and rigidly retained on inner flange 23 by the snap ring 7. An inner row of balls 25 and an outer row of balls 26 are separated by an intermediate flange 28 forming the outer turning ring. The flange 28 presents a radial collar 28a pierced with holes 6 adjacent its outer periphery to permit its fastening on the rim of wheel 32 and at the same time the fastening of brake disc 33 with bolts 30.

FIG. 7 presents another variation of the bearing of FIG. 1 as applied to and forming a part of the hub of a bicycle wheel. The bearing comprises an outer flange 34 mounted on axle or shaft 40 of the bicycle hub and retained thereon by snap ring 41, an outer row of balls 35 and an inner row of balls 36, an intermediate flange 37 separating the two rows of balls and servicing as the outer ring for the bearing, and an inner flange 39 mounted on shaft 40. Flange 37 presents a radial collar 37a pierced with a plurality of circumferentially spaced holes 38 adjacent the outer periphery to permit anchoring of the spokes 42. In this embodiment, the two flanges 34 and 39 which form the inside ring of the bearing are not in contact with one another but are located axially of one another in accordance with the desired load. For this purpose, a washer 43 and the nuts 44 and 45 permit locking of the bearing units at a given preload against the snap ring 41 on axle 40.

FIG. 8 represents a further variation of the bearing of FIG. 1. As shown, this bearing comprises an inside ring made up of inner and outer flanges 46 and 47, respectively, an inner row of barrel rollers 48 positioned by cage 49, an outer row of barrel rollers 50 positioned by cage 51, and an intermediate flange 52 forming an outside ring and having its inner portion contoured to separate the two rows of barrel rollers 48 and 50. The outer part 52a of flange 52 can either be extended in the shape of a radial collar pierced with holes 53 to permit fastening of the bearing as shown in the broken lines on the Figure, or bent back to form a tubular part 52b that can be held and locked on its faces in a cylindrical housing in the manner of conventional bearings.

FIG. 9 represents another variation of the bearing of FIG. 1. As shown, this bearing includes an inside ring made up of inner and outer flanges 54, 55, respectively, an inner row of conical roller bearings 56 held and separated from one another by a cage 57, an outer row of conical roller bearings 58 also held and separated by a cage 59, and an intermediate flange 60 forming the outside ring and having its inner portion shaped to separate the two rows of conical rollers. The outer portion 60a of flange 60 can either be extended in the shape of a radial collar pierced with holes 53 or bent back to form a tubular part 60b in the manner described above. The angles and generatrices of the conical rollers converge at the same point on the longitudinal axis of the bearing.

FIG. 10 shows a roller bearing according to the present invention which comprises an outer ring made up of inner and outer flanges 101 and 102, an inner ring made up of intermediate flange 103, an inner row of balls 104, and an outer row of balls 105. Inner flange 101 is made up of a circular piece of sheet shaped to present a radial collar directed outward forming a fastening flange 101a. In the vicinity of its center, flange 101 has a portion 101b shaped to give it on the inside a radius slightly greater than balls 104 and forming a race for these balls.

Outer flange 102 is made up of a circular piece or sheet shaped to present a radial collar directed outward and forming fastening flange 102a which is superimposed on flange 101a of flange 101. Flange 102 also includes a tubular central portion 102b and an inwardly turned portion 102c to define an outside race for the outer balls 105. Intermediate flange 103 is made up of a circular piece which, near its peripheral portion 103a, encases balls 105, and whose central portion is shaped to define the bore 103b of the inside ring of the bearing. The shape of the flange 103 adjacent its outer peripheral portion 103a provides an inner race for the outer balls 105, and adjacent its inner periphery, an inner race 103c for the inner balls 104. Straight line 118 which joins the outside and inside points of contact of outer balls 105 cuts the same axis XX at obtuse angle $\beta$. Straight line 117 which joins the outside and inside contact points of inner balls 104 cuts the same axis XX at an acute angle $\alpha$. In this way, the bearing can support axial loads in two directions. Portions 101a and 102a of flanges 101 and 102, respectively, are pierced with holes 106 to permit assembly of these two flanges together and fastening of the outside ring on a mechanical element. Assembly of the two flanges together can be achieved by fastening with bolts, rivets, welding, or any other suitable means.

Figure 11:
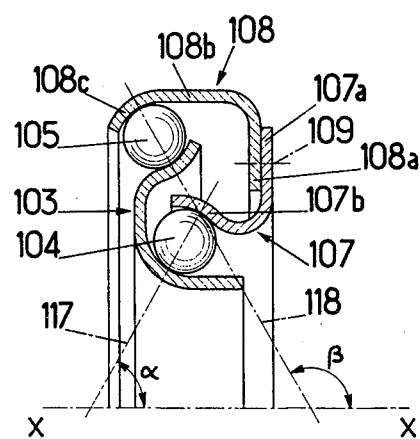
FIG. 11 is a view similar to FIG. 10 and showing a variation thereof.

The structure of FIG. 11 represents a variation of the bearing of FIG. 10 wherein the bearing comprises an outer ring made up of inner and outer flanges 107 and 108, respectively, an inside ring made up of an intermediate flange 103, and inner and outer rows of balls 104 and 105, respectively.

Inner flange 107 is made up of a circular piece shaped to present at its outer periphery a radial collar 107a directed outward, and in the vicinity of its center a tulip-like portion 107b which defines the outer race of inner balls 104. Outside flange 108 is made up of a circular piece shaped to present, at one end, a radial collar 108a directed inward, collars 107a and 108a coming into juxtaposition. Flange 108 presents, in addition, in its greatest diameter, a tubular part 108b that can be held in a cylindrical housing of a mechanical element and whose shape 108c at the outer end defines on the inside an outer race for outer balls 105.

Radial collars 107a and 108a of flanges 107 and 108 can, if desired, be pierced with holes located on the same diameter so as to permit assembly of the two elements together by suitable fasteners or by spot welding as indicated at 109. Straight lines 117 and 118 joining the contact points of balls 104 and 105, respectively, also cut the axis XX of the bearing of FIG. 11 at acute angles α and obtuse angles β.

Figure 12:
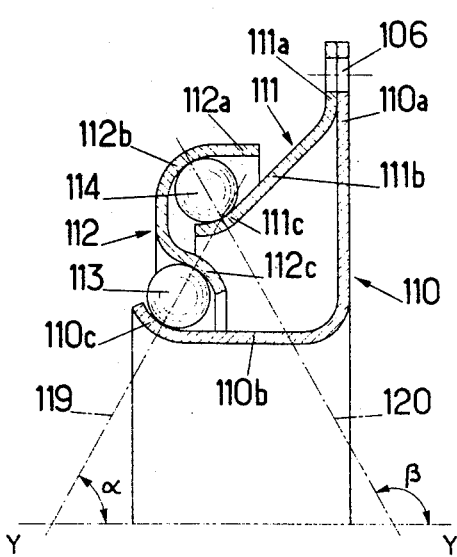
FIG. 12 is a fragmentary sectional view of a further bearing constructed according to the invention.

The bearing illustrated in FIG. 12 comprises an outer ring made up of inner and outer flanges 110 and 111, an inner ring formed by a portion 110b of flange 110, an inner row of balls 113, and an outer row of balls 114. Inner flange 110 is made up of a circular piece of sheet shaped to present at its periphery a fastening collar 110a and in the vicinity of its center a tubular part 110b which terminates at the outer end in a portion 110c curved at a radius slightly greater than that of the balls 113 and defining the inside race for the balls 113. The flange 111 is conventionally called the outer flange while flange 110 is the inner flange and flange 112 is conventionally referred to as the intermediate flange. Thus, in FIG. 12, the outer flange 111 constitutes the inner race of the outer row of balls 114 while the inner flange 110 constitutes the inner race of the inner row of balls 113. The intermediate flange 112 constitutes the outer race for both the inner and outer balls 113 and 114. At the same time, the inner ring for the bearing assembly is formed by the flanges 110 and 111 while the outer ring of the bearing is formed by the intermediate flange 112.

Outer flange 111 is made up of a circular piece or sheet shaped to present at its outer periphery a fastening collar 111a coming in juxtaposition with flange 110a and at its central portion an approximately truncated conical part 111b which, at its smallest diameter portion 111c, defines an inner race for the outer balls 114. Balls 113 and 114 are encased by intermediate flange 112 forming the outside ring. Flange 112 is made up of a circular piece of sheet shaped to present at its greatest diameter a tubular part 112a that can be held in a cylindrical housing. The suitable shape of this flange 112 forming the outer ring defines on its inside 112b an outer race for outer balls 114, and on its outside 112c, an outside race for inner balls 113. Straight lines 119 and 120 joining the points of contact of balls 113, 114, respectively, cut axis YY of the bearing of FIG. 12 at acute angles α and obtuse angles β. Flanges 110 and 111 may be pierced with holes 106 located on the same diameter to permit assembly of the two flanges together and the fastening of the inside ring on a shaft or the like. Flanges 110 and 111 can be assembled by suitable fasteners or by welding.

Figure 13:
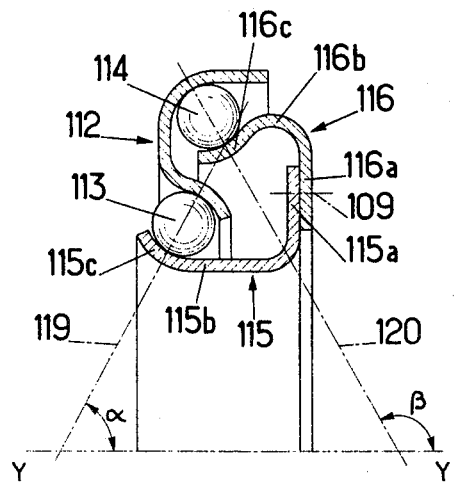
FIG. 13 is a view similar to FIG. 12 and showing a variation thereof.

FIG. 13 represents a variation of the bearing of FIG. 12 wherein the bearing comprises an inner ring made up of inner and outer flanges 115, 116, respectively, an outer ring made up of an intermediate flange 112 identical with that of the embodiment shown in FIG. 12, and inner and outer rows of balls 113, 114, respectively. Inner flange 115 comprises a circular piece having a radial collar 115a directed outward and a tubular part defining the bore of the inner ring and which terminates in a hollowed shape 115c defining the inner race for the inner row of balls 113. Outer flange 115 is made up of a circular piece shaped to present, at one end, a radial collar 116a directed inward and at its largest diameter a tubular part 116b whose shape at the outer end 116c defines an inside race for the outer balls 114. Radial collars 115a and 116a of the flanges 115 and 116 are joined in overlying juxtaposition by suitable means such as fasteners or by welding as indicated at 109. The straight lines 119 and 120 joining the contact points, respectively, of balls 113 and 114 cut axis YY at acute angles α and obtuse angles β.

Antifriction bearings according to the present invention can be used as bearings for extremely diverse applications in their simplest form as shown, for example, in FIGS. 1 and 4 and 10 through 13. In their more elaborate and specialized forms, these bearings can be adapted for more specific and specialized uses as is illustrated with reference to FIGS. 6 and 7.

In the above description, mention has not been made of lubrication seals, special fittings and the like which are well-known. However, it is to be understood that such devices can readily be adapted to the bearings according to the present invention where adverse conditions require that the bearing be protected. Thus, while I have disclosed and described preferred embodiments of my invention, I wish it understood that I do not intend to be restricted solely thereto, but that I do intend to include all embodiments thereof which would be apparent to one skilled in the art and which come within the spirit and scope of my invention.

What is claimed is:

1. An antifriction bearing adapted to be mounted between two relatively rotatable mechanical members, said bearing comprising two annular rows of bearing elements mounted approximately in the same radial plane, an intermediate flange formed from a sheet metal material adapted to be secured to one of said mechanical members and providing an inner race for one of said two rows of bearing elements and an outer race for the other of said two rows, an inner and an outer flange formed from a metal sheet material and being adapted to be secured to the other of said mechanical members, each of said inner and outer flange providing another race one for each of said two rows of bearing elements, said inner flange having a surface inclined with respect to the rotational axis of the antifriction bearing to contact the bearing elements in the other of said rows at points which are closer to the bearing axis than are the centers of the bearing elements in the other of said rows, each bearing element in both of said rows of bearing elements contacting said flanges at points on a line which forms an acute angle with respect to the rotational axis of the antifriction bearing, one of said inner and outer flanges having an integrally formed annular portion in the form of a tubular sleeve concentric with the axis of the bearing and adapted to be directly fitted on a corresponding cylindrical part of said other mechanical member.

2. The bearing according to claim 1 wherein said intermediate flange further comprises a portion defining the inner ring of the bearing, and wherein said inner and outer flanges include portions cooperating to form the outer ring of the bearing.

3. The bearing according to claim 1 further comprising locking means joining said inner and said outer flanges, said locking means including means urging said inner and said outer flanges toward one another.

4. The bearing according to claim 3 wherein said inner and outer flanges are normally spaced from one another, and said locking means includes adjustable means for varying the force urging said inner and outer flanges toward one another.

5. The bearing according to claim 1 wherein said bearing elements are balls.

6. The bearing according to claim 1 wherein said bearing elements are rollers.

7. The bearing according to claim 1 further comprising cage means separating said bearing elements in each of said rows of bearing elements from one another.

8. The bearing of claim 1 wherein said intermediate flange includes an integrally formed external annular portion in the form of a tubular sleeve concentric with the axis of the bearing and adapted to be fitted on the inside of a corresponding cylindrical part of said one mechanical member.

9. The bearing according to claim 1 wherein said bearing elements are balls.

10. The bearing according to claim 1 wherein said bearing elements are rollers.

11. The bearing according to claim 1 further comprising cage means separating said bearing elements in each of said rows of bearing elements from one another.

12. An antifriction bearing adapted to be mounted between two relatively rotatable mechanical member, said bearing comprising two annular rows of bearing elements mounted approximately in the same radial plane, an intermediate flange formed from a metal sheet material adapted to be secured to one of said mechanical members and providing an inner race for each of said two rows of bearing elements, an inner and an outer flange formed from a metal sheet material and being adapted to be secured to the other of said mechanical members, each of said inner and outer flange providing another race one for each of said two rows of bearing elements, at least one of said inner, outer and intermediate flange having an integrally formed annular portion in the form of a tubular sleeve concentric with the axis of the bearing and adapted to be directly fitted on a corresponding cylindrical part of said other mechanical member.

13. The bearing according to claim 12 wherein said inner and said outer flanges each comprise a radially extending collar portion with the collar portions extending toward one another and in overlapping juxtaposition, and means rigidly joining said collars to one another.

14. The bearing according to claim 12 wherein said bearing elements are balls.

15. An antifriction bearing adapted to be mounted between two relatively rotatable mechanical members, said bearing comprising two annular rows of bearing elements mounted approximately in the same radial plane, an intermediate flange formed from a metal sheet material adapted to be secured to one of said mechanical members and providing an outer race for each of said two rows of bearing elements, an inner and an outer flange formed from a metal sheet material and being adapted to be secured to the other of said mechanical members, each of said inner and outer flanges providing another race one for each of said two rows of bearing elements, at least one said inner, outer and intermediate flanges having integrally formed annular portion in the form of a tubular sleeve concentric with the axis of the bearing and adapted to be directly fitted on a corresponding cylindrical part of said other mechanical member.

16. The bearing according to claim 15 wherein said inner and said outer flanges each comprise a radially extending collar portion with the collar portion extending toward one another and in overlapping juxtaposition, and means rigidly joining said collars to one another.

* * * * *